(12) United States Patent
Sakamoto et al.

(10) Patent No.: US 9,916,658 B2
(45) Date of Patent: Mar. 13, 2018

(54) DISEASE ANALYSIS APPARATUS, CONTROL METHOD, AND PROGRAM

(71) Applicants: NEC Corporation, Tokyo (JP); Keio University, Tokyo (JP)

(72) Inventors: Michiie Sakamoto, Tokyo (JP); Akinori Hashiguchi, Tokyo (JP); Ken Yamazaki, Tokyo (JP); Tokiya Abe, Tokyo (JP); Akira Saito, Tokyo (JP); Tomoharu Kiyuna, Tokyo (JP)

(73) Assignees: Keio University, Tokyo (JP); NEC Corporation, Tokyo (JP)

( * ) Notice: Subject to any disclaimer, the term of this patent is extended or adjusted under 35 U.S.C. 154(b) by 38 days.

(21) Appl. No.: 15/022,032

(22) PCT Filed: Aug. 15, 2014

(86) PCT No.: PCT/JP2014/071478
§ 371 (c)(1),
(2) Date: Mar. 15, 2016

(87) PCT Pub. No.: WO2015/040990
PCT Pub. Date: Mar. 26, 2015

(65) Prior Publication Data
US 2016/0232665 A1    Aug. 11, 2016

(30) Foreign Application Priority Data

Sep. 19, 2013   (JP) ................................ 2013-193859

(51) Int. Cl.
*G06K 9/00*        (2006.01)
*G06T 7/00*        (2017.01)

(52) U.S. Cl.
CPC ........ *G06T 7/0012* (2013.01); *G06K 9/00127* (2013.01); *G06T 2207/10056* (2013.01);
(Continued)

(58) Field of Classification Search
CPC ................... G06T 7/0012; G06T 5/50; G06T 2207/10056; G06T 2207/20016;
(Continued)

(56) References Cited

U.S. PATENT DOCUMENTS 6,025,128 A *   2/2000   Veltri ................... C12Q 1/68
                                                    435/6.14
6,603,869 B1 *  8/2003   Freed .................. G06K 9/0014
                                                    382/129
(Continued)

FOREIGN PATENT DOCUMENTS

CN        101460090 A       6/2009
EP        2 405 265 A1      1/2012
(Continued)

OTHER PUBLICATIONS

Ishido, T., et al., "Morphometrical Analysis of Nuclear Abnormality of Tubular Tumors of the Stomach with Image Processing," Jpn. J. Cancer Res., vol. 83, pp. 294-299 (Mar. 1992).
(Continued)

*Primary Examiner* — Jose Couso
(74) *Attorney, Agent, or Firm* — Wilmer Cutler Pickering Hale and Dorr LLP

(57) ABSTRACT

An image acquisition unit (2020) acquires an analysis image. The analysis image is an image in which a plurality of cell nuclei in a lesion of a target person are captured. A feature-value calculation unit (2040) calculates the feature-value relating to the cell nuclei from the analysis image. An evaluation function acquisition unit (2060) acquires an evaluation function from an evaluation function storage unit (10). The evaluation function is a function with which prediction information is calculated based on the feature-value. The prediction information generation unit (2080) generates prediction information relating to a target person based on a feature-value, which has been calculated from an
(Continued)

analysis image, and an evaluation function which has been acquired by the evaluation function acquisition unit (2060). The prediction information is information indicating a prediction of a prognosis of a disease of the target person or a prediction of malignancy of a disease of the target person.

15 Claims, 11 Drawing Sheets

(52) U.S. Cl.
CPC .............. *G06T 2207/30024* (2013.01); *G06T 2207/30096* (2013.01)

(58) Field of Classification Search
CPC . G06T 2207/20021; G06T 2207/20081; G06T 2207/3004–2207/30104; G06K 9/00127; G06K 9/00147; G06K 9/0014; G06K 9/00; G06K 9/6253; G06K 9/6277; G06K 9/00496; G06K 9/6289; G06K 2209/05–2209/055; G06K 2209/07; G06F 19/321; G06F 19/345; G06F 19/00; G06F 19/30; G06F 19/3437; G06F 19/3443; G06F 19/3487; G06F 3/048; G01N 33/4833; G01N 33/5035; G01N 33/57484; G01N 33/566; G01N 33/5082; G01N 33/6893; G01N 2800/60; G06Q 50/24; A61K 49/0004; A61K 49/0093; A61K 49/0438; A61B 5/00; A61B 5/0013; A61B 5/0082; A61B 5/4538; A61B 5/48; A61B 5/7275; A61B 5/7282; A61B 6/5211; A61B 6/5217; A61B 8/5215; A61B 8/5223; A61B 2505/00; A61B 2576/00; H04N 2201/0079; Y10S 128/922; Y10S 436/813

See application file for complete search history.

(56) References Cited

U.S. PATENT DOCUMENTS

| | | | |
|---|---|---|---|
| 8,265,359 B2* | 9/2012 | Andrushkiw | G06T 7/0012 |
| | | | 382/128 |
| 8,265,370 B2 | 9/2012 | Ducksbury et al. | |
| 8,559,693 B2* | 10/2013 | MacAulay | G06T 7/0012 |
| | | | 382/128 |
| 8,594,410 B2* | 11/2013 | Schmidt | G06K 9/6253 |
| | | | 382/128 |
| 2005/0136549 A1* | 6/2005 | Gholap | G06K 9/0014 |
| | | | 436/501 |
| 2007/0135999 A1* | 6/2007 | Kolatt | G01N 21/31 |
| | | | 702/19 |
| 2007/0160272 A1 | 7/2007 | Nagamine et al. | |
| 2008/0091102 A1 | 4/2008 | Maeda et al. | |
| 2010/0088264 A1 | 4/2010 | Teverovskiy et al. | |
| 2010/0169811 A1* | 7/2010 | Yamada | G01N 15/1475 |
| | | | 382/133 |
| 2012/0004514 A1 | 1/2012 | Marugame | |
| 2013/0136324 A1 | 5/2013 | Sakamoto et al. | |
| 2013/0136325 A1 | 5/2013 | Sakamoto et al. | |
| 2013/0226548 A1 | 8/2013 | Beck et al. | |
| 2014/0193052 A1 | 7/2014 | Yoshihara et al. | |
| 2016/0070949 A1* | 3/2016 | Tunstall | G06K 9/0014 |
| | | | 382/133 |
| 2016/0253469 A1* | 9/2016 | Donovan | G06F 19/3437 |
| 2017/0103521 A1* | 4/2017 | Chukka | G06T 7/0012 |
| 2017/0116734 A1* | 4/2017 | Van Leeuwen | G06T 7/0014 |

FOREIGN PATENT DOCUMENTS

| | | |
|---|---|---|
| JP | 2010-523979 A | 7/2010 |
| JP | 2013-108926 A | 6/2013 |
| JP | 2013-113680 A | 6/2013 |
| WO | WO-2010/100704 A1 | 9/2010 |
| WO | WO-2013/027399 A1 | 2/2013 |
| WO | WO-2013/049312 A2 | 4/2013 |

OTHER PUBLICATIONS

Japanese Decision to Grant a Patent issued by the Japan Patent Office for Japanese Application No. 2015-537606 dated May 23, 2017 (2 pages—no translation).
Tanaka, T., et al., "Discriminant Analysis for Severity Assessment of Tumor," The Papers of Technical Meeting on Medical and Biological Engineering, IEE Japan, MBE-08-29-34, 7 pages (Jan. 31, 2008).
International Search Report corresponding to PCT/JP2014/071478, dated Nov. 18, 2014 (5 pages).
Chinese Office Action issued by the State Intellectual Property Office of People's Republic of China for Chinese Application No. 201480051066.1 dated Aug. 14, 2017 (16 pages).

* cited by examiner

FIG. 5

| | 100 |
|---|---|
| PRESENCE AND ABSENCE OF RECURRENCE | PRESENT |
| RECURRENCE TIME | WITHIN ONE YEAR |
| MALIGNANCY | GRADE 2, NO BLOOD VESSEL PERMEATION, AND NO METASTASIS |

102
104
106

DISEASE ANALYSIS APPARATUS, CONTROL METHOD, AND PROGRAM

CROSS-REFERENCE TO RELATED APPLICATIONS

This application is a national stage application of International Application No. PCT/JP2014/071478 entitled "Disease Analysis Apparatus, Control Method, and Program," filed on Aug. 15, 2014, which claims priority to Japanese Patent Application No. 2013-193859, filed on Sep. 19, 2013, the disclosures of each which are hereby incorporated by reference in their entirety.

TECHNICAL FIELD

The present invention relates to a disease analysis apparatus, a control method, and a program.

BACKGROUND ART

There is a method for performing pathological diagnosis by observing the tissue structure of a pathological sample, the shape of a cell nucleus, or the like using a microscope. In general, pathological diagnosis performed using a pathological sample is performed through a qualitative method based on the experience of a physician. In addition, the pathological diagnosis performed using a pathological sample is less frequently used for predicting a prognosis of a disease while being used for determining the presence or absence of any disease at the current time.

There is Patent Document 1 as a system for predicting a prognosis of a disease based on quantitative information. Patent Document 1 discloses a system for predicting the recurrence of a disease or suitable therapy by inputting clinical features, molecular features, or form-measuring features of a patient into a prediction model.

RELATED DOCUMENT

Patent Document

[Patent Document 1] PCT Japanese Translation Patent Application Publication No. 2010-523979

SUMMARY OF THE INVENTION

The present inventors have examined a method for predicting a prognosis of a disease of a target person through a new method using quantitative information.

The present invention has been made in consideration of such circumstances. An object of the present invention is to provide a technique for predicting a prognosis of a disease of a target person through a new method using quantitative information.

A disease analysis apparatus provided with the present invention comprises: an image acquisition unit acquiring an analysis image that is an image in which a plurality of cell nuclei in a lesion of a target person calculating a feature-value relating to the cell nuclei using the analysis image; an evaluation function acquisition unit acquiring an evaluation function from an evaluation function storage unit storing the evaluation function with which prediction information is calculated based on the feature-value, the prediction information indicating a prediction relating to a prognosis of a disease or a prediction relating to malignancy of a disease; and a prediction information generation unit generating the prediction information relating to the target person, based on the feature-value calculated from the analysis image, and based on the evaluation function.

A control method provided by the present invention is executed by a computer. This control method comprises: an image acquisition step of acquiring an analysis image that is an image in which a plurality of cell nuclei in a lesion of a target person are captured;
a feature-value calculation step of calculating a feature-value relating to the cell nuclei using the analysis image;
an evaluation function acquisition step of acquiring an evaluation function from an evaluation function storage unit storing the evaluation function with which prediction information is calculated based on the feature-value, the prediction information indicating a prediction relating to a prognosis of a disease or a prediction relating to malignancy of a disease; and
a prediction information generation step of generating the prediction information relating to the target person, based on the feature-value calculated from the analysis image, and based on the evaluation function.

A program provided by the present invention causes a computer to have functions to be operated as a disease analysis apparatus provided by the present invention. This program causes this computer to have functions of functional constituent units included in the disease analysis apparatus provided by the present invention.

According to the present invention, there is provided a technique for predicting a prognosis of a disease of a target person through a new method using quantitative information.

BRIEF DESCRIPTION OF THE DRAWINGS

The above-described object and other objects, and the characteristics and the advantages become clearer using favorable exemplary embodiments described below, and the following drawings accompanied therewith.

FIG. 5 is a view illustrating the prediction information generated by a prediction information generation unit in a table format.

DESCRIPTION OF EMBODIMENTS

Figure 1:
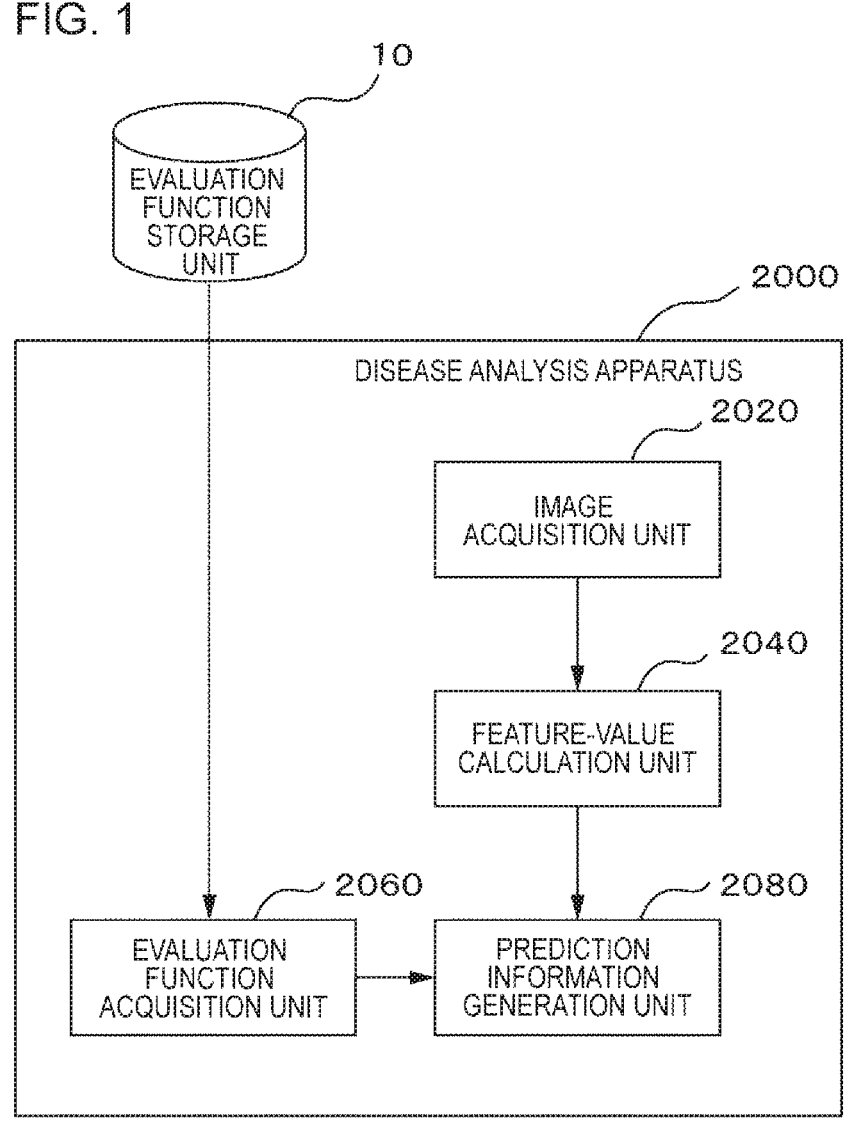
FIG. 1 is a block diagram illustrating a disease analysis apparatus according to Exemplary embodiment 1.

Hereinafter, exemplary embodiments of the present invention will be described using drawings. In all of the drawings, components having the same configuration are given the same reference numerals and the description will not be appropriately repeated.

[Exemplary Embodiment 1]

FIG. 1 is a block diagram illustrating a disease analysis apparatus 2000 according to Exemplary embodiment 1. In FIG. 1, the arrow represents the flow of information. Furthermore, in FIG. 1, each block does not show a configuration of a hardware unit, but shows a configuration of a functional unit.

The disease analysis apparatus 2000 generates information indicating a prediction relating to a prognosis of a disease of a target person (e.g. patient or the like), or a prediction relating to malignancy of a disease of a target person. To do so, the disease analysis apparatus 2000 has an image acquisition unit 2020, a feature-value calculation unit 2040, an evaluation function acquisition unit 2060, and a prediction information generation unit 2080. Hereinafter, these functional constituent units will be described.

<Image Acquisition Unit 2020>

The image acquisition unit 2020 acquires an analysis image. A plurality of cell nuclei of a lesion of a target person are captured in the analysis image. For example, the analysis image includes 3000 cell nuclei to 5000 cell nuclei. For example, the analysis image is an image obtained by imaging a pathological sample. The pathological sample is produced by subjecting tissue collected from a target person to Hematoxylin-Eosin dye (HE dye).

<Feature-Value Calculation Unit 2040>

The feature-value calculation unit 2040 calculates the feature-value relating to cell nuclei using an analysis image.

<Evaluation Function Acquisition Unit 2060>

The evaluation function acquisition unit 2060 acquires an evaluation function from an evaluation function storage unit 10. The evaluation function storage unit 10 is a storage unit storing an evaluation function. The evaluation function is a function calculating prediction information based on the feature-value.

<Prediction Information Generation Unit 2080>

The prediction information generation unit 2080 generates prediction information relating to a target person based on a feature-value having been calculated using an analysis image and an evaluation function having been acquired by the evaluation function acquisition unit 2060. The prediction information is information indicating a prediction of a prognosis of a disease of the target person or a prediction of malignancy of a disease of the target person.

The prediction of a prognosis of a disease is, for example, a prediction as to whether or not a disease recurs, or a prediction of time in which a disease recurs. The malignancy of a disease indicates the difficulty of therapy of a disease, the degree of rapidity of the progression of a disease, the magnitude of the influence of a disease on a patient, or the like. For example, the malignancy of a disease is represented by an index value, which is divided into stages or the like. For example, a grade or the like is an index value indicating malignancy of cancer and being divided into stages. However, a method for indicating the malignancy of a disease is not limited to the method of using an index value being divided into stages. Note that, the prediction of a prognosis of a disease may be a prediction of malignancy of a disease in a case where the disease recurs.

<Advantageous Effect>

According to the disease analysis apparatus 2000 of this exemplary embodiment, with the above-described configuration, prediction information relating to a prognosis or malignancy of a disease with respect to a target person is generated based on information (feature-value) in which morphological features of a cell nucleus are quantitatively indicated. Accordingly, it is possible to predict a prognosis or malignancy of a disease of a target person through a new method using quantitative information such as a feature-value of cell nuclei.

The prediction of a prognosis of a disease uses gene expression, a molecular marker, or the like. The expression of a gene or a molecular marker is mainly controlled by intranuclear molecules, and as a matter of course, the change in the state of these molecules is reflected in morphological features of a nucleus. In general, a criterion on "how much the form of a cell nucleus is deviated from a normal case" is included in determination criteria of malignancy or the like in pathological diagnosis. In general, it is more difficult to detect the change in the morphological features of a cell nucleus compared to the change in a tissue structure constructed by cells. From the above, it is possible to more precisely predict a prognosis of a disease or malignancy of a disease by predicting the prognosis of a disease or the malignancy of a disease based on the features of the cell nucleus, comparing to a case where features of a cell nucleus are not used.

In general, there is a method in which a pathological sample is prepared using a specific dyeing method and a prognosis or malignancy of a disease is predicted based on whether or not cells contained in the pathological sample are dyed through the dyeing. For example, there is a method in which it is examined whether or not cytokeratin 19 is expressed through the dyeing method for dyeing cytokeratin 19.

However, even if the fact that "particular molecules are expressed in the cells which have been dyed through dyeing" is indicated through this method, the cell nuclei thereof are not certainly abnormal. On the contrary, even if certain cells are not dyed through the dyeing, this does not certainly mean that the cell nuclei thereof are normal.

It is known that there is a connection between the form of a cell nucleus and the state (prognosis or malignancy) of a disease, as a rule of thumb. The disease analysis apparatus 2000 of this exemplary embodiment predicts a prognosis of a disease or malignancy of a disease based on the feature-value of cell nuclei, and it is therefore possible to determine a morphological abnormality of a cell nucleus, even regarding an "abnormal cell being not able to be determined by a gene or a molecular marker." Thus, according to the disease analysis apparatus 2000 of this exemplary embodiment, it is possible to predict the possibility that a disease recurs or malignancy of a disease with higher accuracy, independently from expression of a gene or a molecular marker.

<Hardware Configuration>

The disease analysis apparatus 2000 may be one or a plurality of various computers. For example, the disease analysis apparatus 2000 is a desktop personal computer (PC) or a server computer. In addition, the disease analysis apparatus 2000 may be a portable terminal such as a cellular phone or tablet PC.

Each functional constituent unit included in the disease analysis apparatus 2000 is implemented as, for example, at least one software component individually or in a state in which a plurality of functional constituent units are combined. In addition, each of the functional constituent units is implemented as, for example, at least one software component. In addition, each of the functional constituent units is implemented by, for example, combining a hardware component and a software component.

Figure 2:
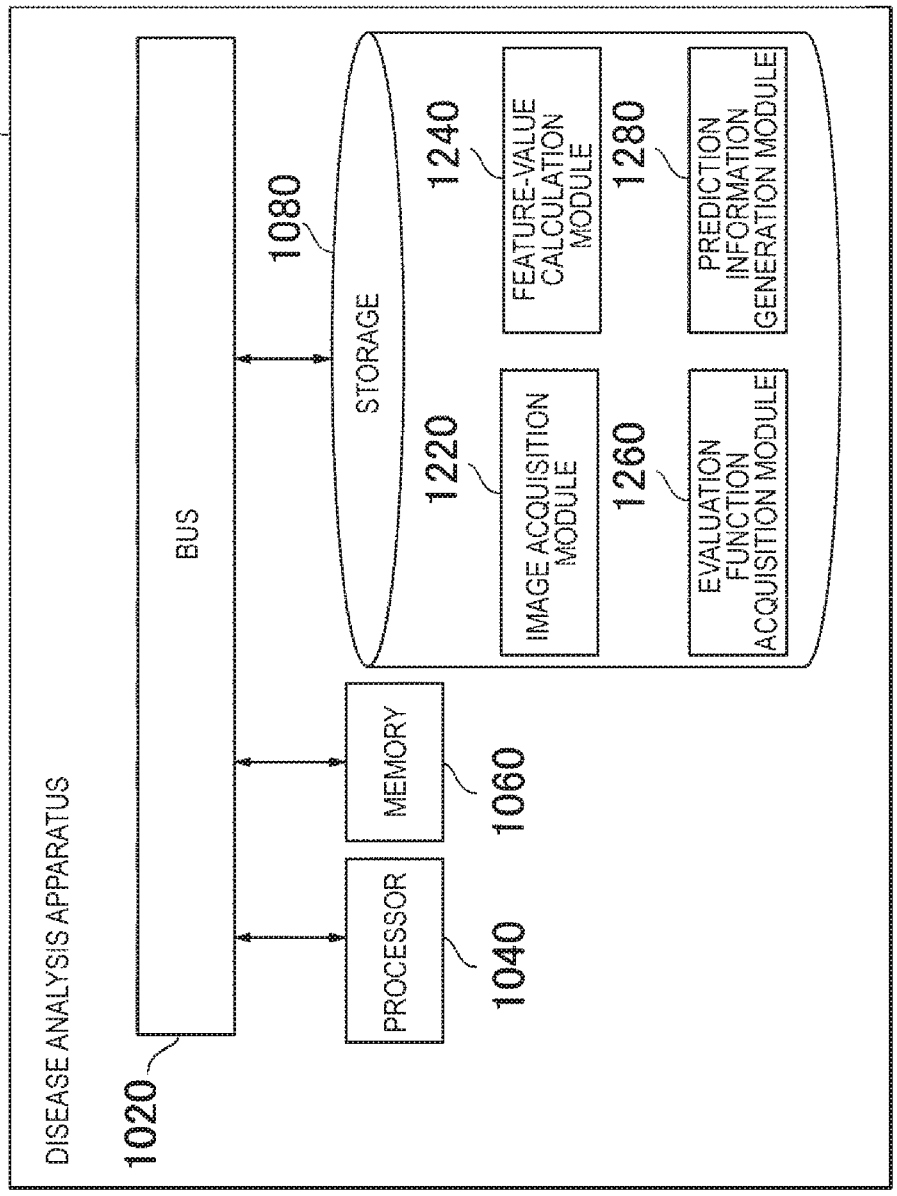
FIG. 2 is a block diagram illustrating a hardware configuration of the disease analysis apparatus according to Exemplary embodiment 1.

FIG. 2 is a block diagram illustrating a hardware configuration of the disease analysis apparatus 2000 according to Exemplary embodiment 1. In FIG. 2, the disease analysis apparatus 2000 has a bus 1020, a processor 1040, a memory 1060, and a storage 1080.

The bus 1020 is a data transmission path through which the processor 1040, the memory 1060, and the storage 1080 transmits data to and receives data from each other. The processor 1040 is, for example, an arithmetic processing device such as a central processing unit (CPU) or a graphics processing unit (GPU). The memory 1060 is, for example, a memory such as a random access memory (RAM) or a read only memory (ROM). The storage 1080 is, for example, a storage device such as a hard disk, a solid state drive (SSD), or a memory card. In addition, the storage 1080 may be a memory such as a RAM or a ROM.

An image acquisition module 1220 is a program for causing the disease analysis apparatus 2000 to have a function of the image acquisition unit 2020. The processor 1040 realizes the function of the image acquisition unit 2020 by executing the image acquisition module 1220.

A feature-value calculation module 1240 is a program for causing the disease analysis apparatus 2000 to have a function of the feature-value calculation unit 2040. The processor 1040 realizes the function of the feature-value calculation unit 2040 by executing the feature-value calculation module 1240.

An evaluation function acquisition module 1260 is a program for causing the disease analysis apparatus 2000 to have a function of the evaluation function acquisition unit 2060. The processor 1040 realizes the function of the evaluation function acquisition unit 2060 by executing the evaluation function acquisition module 1260.

A prediction information generation module 1280 is a program for causing the disease analysis apparatus 2000 to have a function of the prediction information generation unit 2080. The processor 1040 realizes the function of the prediction information generation unit 2080 by executing the prediction information generation module 1280.

For example, the processor 1040 reads and executes each of the above-described modules on the memory 1060. However, the processor 1040 may execute each of the above-described modules without reading the modules on the memory 1060.

The storage 1080 stores each of the above-described modules. In addition, in a case where the evaluation function storage unit 10 is provided inside the disease analysis apparatus 2000, the memory 1060 or the storage 1080 stores an evaluation function.

The hardware structure of the disease analysis apparatus 2000 is not limited to the structure shown in FIG. 2. For example, each of the above-described modules may be stored in the memory 1060. In this case, the disease analysis apparatus 2000 may not include the storage 1080.

<Flow of Processing>

Figure 3:
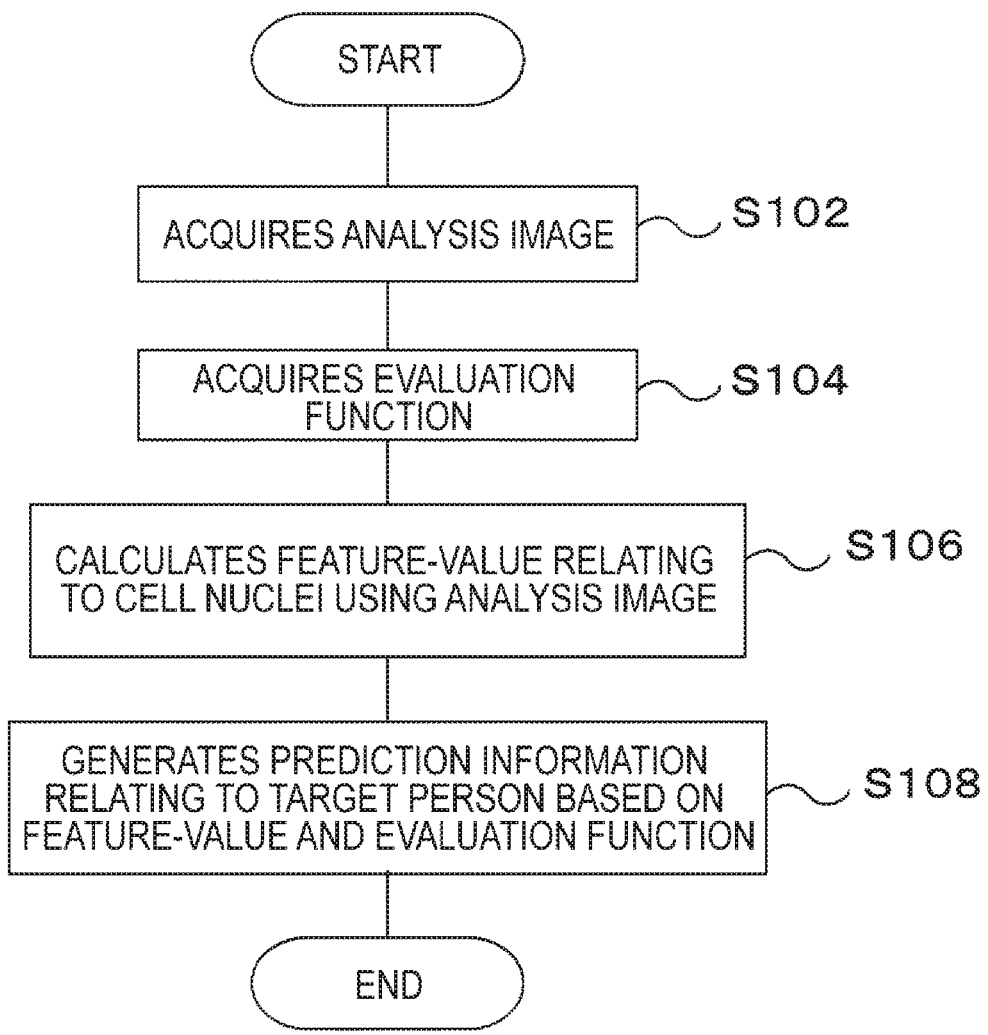
FIG. 3 is a flowchart illustrating the flow of processing executed by the disease analysis apparatus according to Exemplary embodiment 1.

FIG. 3 is a flowchart illustrating the flow of processing executed by the disease analysis apparatus 2000 according to Exemplary embodiment 1. In Step S102, the image acquisition unit 2020 acquires an analysis image. In Step S104, the evaluation function acquisition unit 2060 acquires an evaluation function. In step S106, the feature-value calculation unit 2040 calculates the feature-value relating to cell nuclei from the analysis image. In step S108, the prediction information generation unit 2080 generates prediction information relating to a target person based on the feature-value and the evaluation function.

Hereinafter, the disease analysis apparatus 2000 of this exemplary embodiment will be described in more detail.

<Detail of Evaluation Function Storage Unit 10>

The evaluation function storage unit 10 may be provided outside the disease analysis apparatus 2000, or may be provided inside the disease analysis apparatus 2000. In the case of FIG. 1, the evaluation function storage unit 10 is provided outside the disease analysis apparatus 2000.

The evaluation function for predicting a prognosis of a disease is, for example, made using information relating to a patient whose prognosis is already known (patient in the past). Specifically, this evaluation function is made using a database that stores information associating the feature-value of cell nuclei included in an analysis image of the patient at a time point in the past with the progress of a disease of the patient (the presence or absence of recurrence or a recurrence time).

The evaluation function is, for example, made as follows. First, a variable selection method of discrimination analysis is applied to a plurality of pieces of information associating the feature-value of cell nuclei included in an analysis image of a patient with the progress of a disease of the patient. Accordingly, one or more kinds of feature-values having a high explanation capability the progress of a disease are selected. Moreover, a discrimination function is made using the selected feature-values, and this discrimination function is handled as an evaluation function. There are various known techniques such as a stepwise method in the variable selection method of discrimination analysis. In addition, the method for making the discrimination function using the selected variables is also a known technique. The description of these known techniques will not be repeated.

However, the evaluation function for predicting a prognosis of a disease may be made through methods other than the ones above. For example, the evaluation function for predicting a prognosis of a disease may be made based on the knowledge of a physician, a medical common view, or the like. In addition, the evaluation function may be made by performing addition or deletion of a feature-value on the discrimination function made through the above-described method, based on the knowledge of a physician, a medical common view, or the like.

The evaluation function for predicting malignancy of a disease is made based on, for example, results of diagnosis performed by a physician in the past. Specifically, with respect to a plurality of patients, this evaluation function is made using a database that stores information associating the feature-value of cell nuclei included in an analysis image of a patient at a time point in the past with the malignancy of a disease determined by a physician based on the analysis image thereof. For example, the evaluation function for predicting malignancy of a disease is a discrimination function made through the same method as that of the above-described evaluation function for predicting a prognosis.

However, the evaluation function for predicting malignancy of a disease may be made through a method other than the one above. For example, the evaluation function for predicting malignancy of a disease may be made based on the knowledge of a physician, a medical common view, or the like. In addition, the evaluation function may be made by performing addition or deletion of a feature-value on the discrimination function made through the above-described method, based on the knowledge of a physician, a medical common view, or the like.

The evaluation function is preferably made according to the kind of disease. However, the same evaluation functions may be used in generating prediction information relating to a similar disease.

<Detail of Image Acquisition Unit 2020>

There are various methods in which the image acquisition unit 2020 acquires an analysis image. For example, the image acquisition unit 2020 acquires an analysis image input from an external device. In addition, the image acquisition unit 2020 acquires, for example, an analysis image being manually input. Furthermore, the image acquisition unit 2020 may acquire an analysis image by accessing the external device.

<Detail of Feature-Value Calculation Unit 2040>

The feature-value calculation unit 2040 specifies a cell nucleus from an analysis image in order to calculate the feature-value relating to the cell nucleus. For example, the feature-value calculation unit 2040 specifies a cell nucleus from an analysis image using the difference between the color of a cell nucleus and the color of the periphery of the cell nucleus. For example, when the analysis image is an image obtained by imaging a pathological sample in which tissue of a patient is subjected to HE dyeing, the color of a cell nucleus is different from the color of the periphery of the cell nucleus. Therefore, the feature-value calculation unit 2040 specifies a cell nucleus from the analysis image using the difference in the color. However, the method with which the feature-value calculation unit 2040 specifies a cell nucleus from the analysis image is not limited to this method. The technique for specifying a target object from the image is a known technique, and therefore, description will not be omitted.

For example, the feature-value relating to cell nuclei calculated by the feature-value calculation unit 2040 is a feature-value relating to any one or more factors of the perimeter, the major diameter, the minor diameter, the degree of circularity, and the area of a cell nucleus, the ratio of the area of a rectangle composed of the major diameter and the minor diameter to the area of the cell nucleus, the complexity of a contour line, the density of the cell nucleus, and the dyeing state within the cell nucleus. Here, the major diameter and the minor diameter of the cell nucleus are a major diameter and a minor diameter in a case where the cell nucleus is approximated to an elliptical shape.

The degree of circularity of the cell nucleus is an amount indicating the degree to which the cell nucleus is approximate to a perfect circle. The degree of circularity of the cell nucleus is calculated based on, for example, the area and the perimeter of the cell nucleus. In addition, the circularity of the cell nucleus is calculated based on, for example, the major diameter and the minor diameter of the cell nucleus.

For example, the complexity of a contour line is calculated as follows. First, the feature-value calculation unit 2040 calculates the color density with respect to each image pixel inside a cell nucleus. The feature-value calculation unit 2040 extracts amass of an image pixel of which the color density is greater than or equal to a threshold value, out of the image pixels inside the cell nucleus, as a nuclear body. Next, the feature-value calculation unit 2040 calculates a total value of the perimeter of the extracted nuclear body.

The feature-value calculation unit 2040 calculates total values of the perimeter of the above-described nuclear body with respect to threshold values of a plurality of densities. The feature-value calculation unit 2040 selects only the total value of greater than or equal to the perimeter of the cell nucleus from the plurality of these total values. The sum of the selected total values is handled as the complexity of a contour line.

Figure 4:
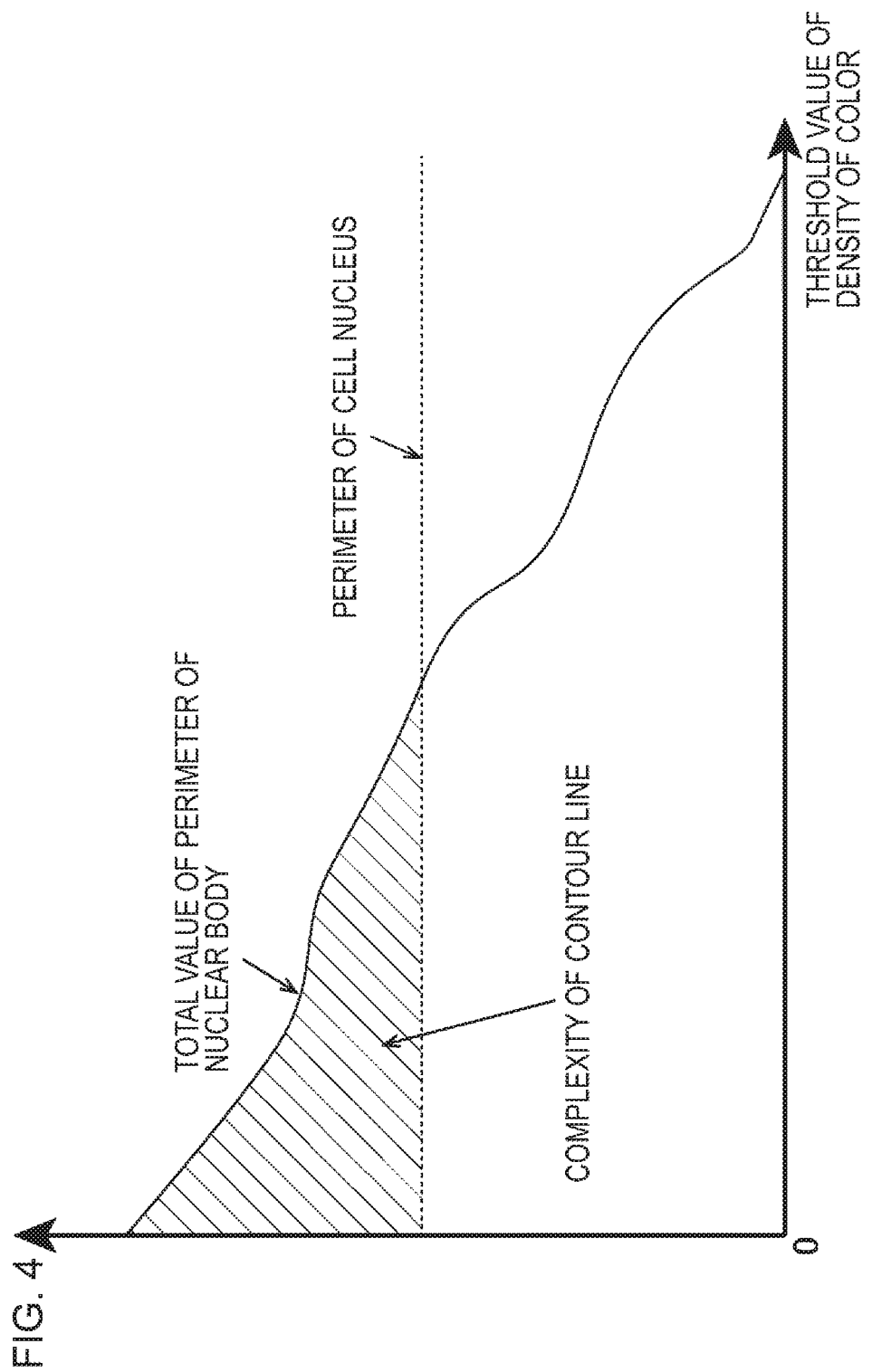
FIG. 4 is a view showing the complexity of a contour line with a graph.

FIG. 4 is a view illustrating the complexity of a contour line with a graph. The X-axis indicates a threshold value of the density. The graph with a solid line shows a total value of the perimeter of the nuclear body. The graph with a dotted line shows the perimeter of the cell nucleus. The area of the region filled with a slanted line shows the complexity of the contour line.

The density of cell nuclei is represented by the number of cells in the vicinity of the cell nuclei. For example, with respect to a certain cell nucleus, the feature-value calculation unit 2040 calculates the number of cell nuclei included in the region, which has the cell nucleus as a center and has the size of several times (for example, 5 times to 6 times) that of the cell nucleus. The feature-value calculation unit 2040 handles this number as the density of the cell nuclei.

The dyeing state within a cell nucleus is defined by, for example, a spot within the cell nucleus. A spot can be generated within the cell nucleus through arrangement of chromatin within the cell nucleus, even if HE dyeing is performed. In addition, a structure called a nucleolus is generated within the cell nucleus, and a spot can be generated within the cell nucleus due to this nucleolus. In general, pathologists call a spot within a cell nucleus a chromatin pattern and consider the spot as grounds for diagnosis. The disease analysis apparatus 2000 calculates a value that is obtained by quantifying this spot within the cell nucleus as a feature-value.

For example, the feature-value calculation unit 2040 calculates the feature-value indicating a dyeing state within a cell nucleus through the following two methods. The first method is as follows. First, the feature-value calculation unit 2040 calculates a gray level co-occurrence matrix (GLCM) with respect to one cell nucleus using an analysis image. The feature-value calculation unit 2040 calculates entropy, an angular second moment, contrast, uniformity, or the like using the calculated GLCM. The feature-value calculation unit 2040 handles any one or more of these values calculated using GLCM, or a statistical value calculated from any one or more of these values, as a feature-value indicating the dyeing state within the above-described cell nucleus.

The second method is as follows. First, the feature-value calculation unit 2040 calculates the luminance of each image pixel included in one cell nucleus. Next, the feature-value calculation unit 2040 extracts only image pixels the luminance of which is included within a predetermined range, among the image pixels within this cell nucleus. The feature-value calculation unit 2040 calculates the feature-value relating to the dyeing state within the cell nucleus using the extracted image pixels.

For example, the feature-value calculated by the feature-value calculation unit 2040 is an area or a fractal dimension of a region represented by only the extracted image pixels. For example, the feature-value calculation unit 2040 handles one region, which is represented by a plurality of adjacent image pixels among the extracted image pixels, as one nuclear body. The feature-value calculation unit 2040 calculates the number of nuclear bodies included in the cell nuclei, as a feature-value. The area of the region represented by only the extracted image pixels is equivalent to the sum of the area of these nuclear bodies.

For example, the feature-value calculated by the feature-value calculation unit 2040 is a ratio of the area of the region represented by only the extracted image pixels to the area of the cell nuclei.

The feature-value calculation unit 2040 may also calculate the feature-value indicating the dyeing state of the cell nuclei using a three-dimensional shape in which the number of above-described extracted image pixels is set as a bottom area and the luminance of image pixels is set as a height. For example, the feature-value is the volume of the above-described three-dimensional shape or a fractal dimension. For example, this feature-value is a ratio of the volume of the above-described three-dimensional shape to the volume of another three-dimensional shape, the bottom surface of which is all of the cell nuclei and the height of which is the size within the above-described predetermined range.

Furthermore, in the second method, the feature-value calculation unit 2040 may calculate the above-described feature-value with respect to each predetermined range using a plurality of the above-described predetermined ranges relating to luminance. For example, the feature-value calculation unit 2040 divides all of the ranges of the luminance into 6 ranges. However, the number of divisions is not limited to 6. In addition, in a case where there are a plurality of predetermined ranges, the feature-value calculation unit 2040 may handle the difference in the above-described feature-value calculated with respect to adjacent predetermined ranges, as a feature-value indicating the dyeing state within the cell nuclei.

The feature-value calculation unit 2040 may calculate one feature-value or a plurality of feature-values among a plurality of the above-described feature-values. In a case of calculating the plurality of kinds of the feature-values, the feature-value calculation unit 2040 calculates, for example, one statistical value by performing statistical processing on the plurality of the calculated feature-values, and this statistical value is handled as a feature-value of cell nuclei. This statistical value is, for example, an average value, a weighted average value, a central value, the maximum value, the minimum value, the most frequent value, an X percentile value (X is a positive integer), or the like with respect to a plurality of feature-values. The X percentile value of the feature-values is a value at a position in an order corresponding to X percentages to all when the plurality of calculated feature-values are arranged in order of size of the values. For example, a 10th percentile value in a case where there are 100 feature-values is the feature-values at the 10th position in a case where the size of the 100 feature-values are arranged in order of size.

The feature-value calculation unit 2040 calculates the feature-value relating to the shape of some or all cell nuclei included in an analysis image. For example, the feature-value calculation unit 2040 calculates one statistical value by performing statistical processing on the calculated feature-value relating to a plurality of cell nuclei, and handles this statistical value as a feature-value relating to the cell nuclei included in the analysis image. This statistical value is, for example, an average value, a weighted average value, a central value, the maximum value, the minimum value, the most frequent value, an X percentile value, or the like with respect to shapes of the plurality of cell nuclei.

In addition, the disease analysis apparatus 2000 may also calculate a feature-value of something other than the cell nuclei from the analysis image so as to use the feature-value thereof in combination of the feature-value of cell nuclei. In this case, the disease analysis apparatus 2000 calculates the thickness or the like of a cord-like structure, which is an array pattern of cells, as a feature-value. In addition, in this case, an evaluation function acquired by the evaluation function acquisition unit 2060 also receives the feature-value such as the thickness or the like of the cord-like structure as an input in addition to the feature-value of the cell nuclei, and generates prediction information from these feature-values.

<Specific Example of Prediction Information>

FIG. 5 is a view illustrating the prediction information generated by the prediction information generation unit 2080 in a table format. The table shown in FIG. 5 is denoted as a prediction information table 100. The prediction information table 100 has three rows: the presence or absence of recurrence 102; a recurrence time 104; and malignancy 106. The prediction information table 100 in FIG. 5 shows prediction of a prognosis such as "the recurrence of a disease occurs within one year", and malignancy such as "grade 2, no blood vessel permeation, and no metastasis".

[Exemplary Embodiment 2]

Figure 6:
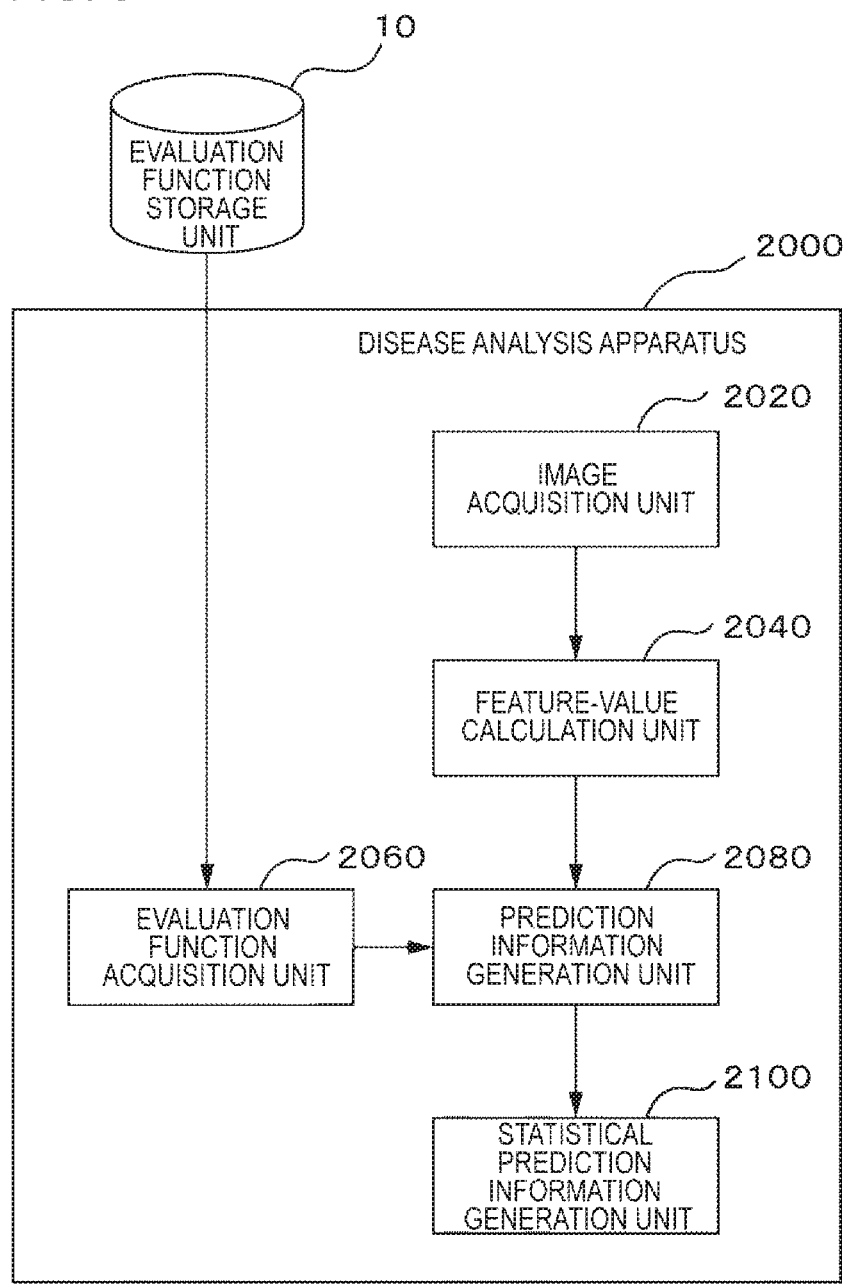
FIG. 6 is a block diagram illustrating a disease analysis apparatus according to Exemplary embodiment 2.

FIG. 6 is a block diagram illustrating a disease analysis apparatus 2000 according to Exemplary embodiment 2. In FIG. 6, the arrow represents the flow of information. Furthermore, in FIG. 6, each block does not show a configuration of a hardware unit, but shows a configuration of a functional unit.

The disease analysis apparatus 2000 of Exemplary embodiment 2 generates prediction information pieces for each plurality of target regions included in an analysis image and performs statistical processing on the plurality of pieces of prediction information. For example, the target regions indicate remarkable regions in the analysis image. In general, these regions are called regions of interest (ROI). However, the target regions are not limited to ROI. For example, the target regions may be regions randomly selected from an analysis image.

Figure 7:
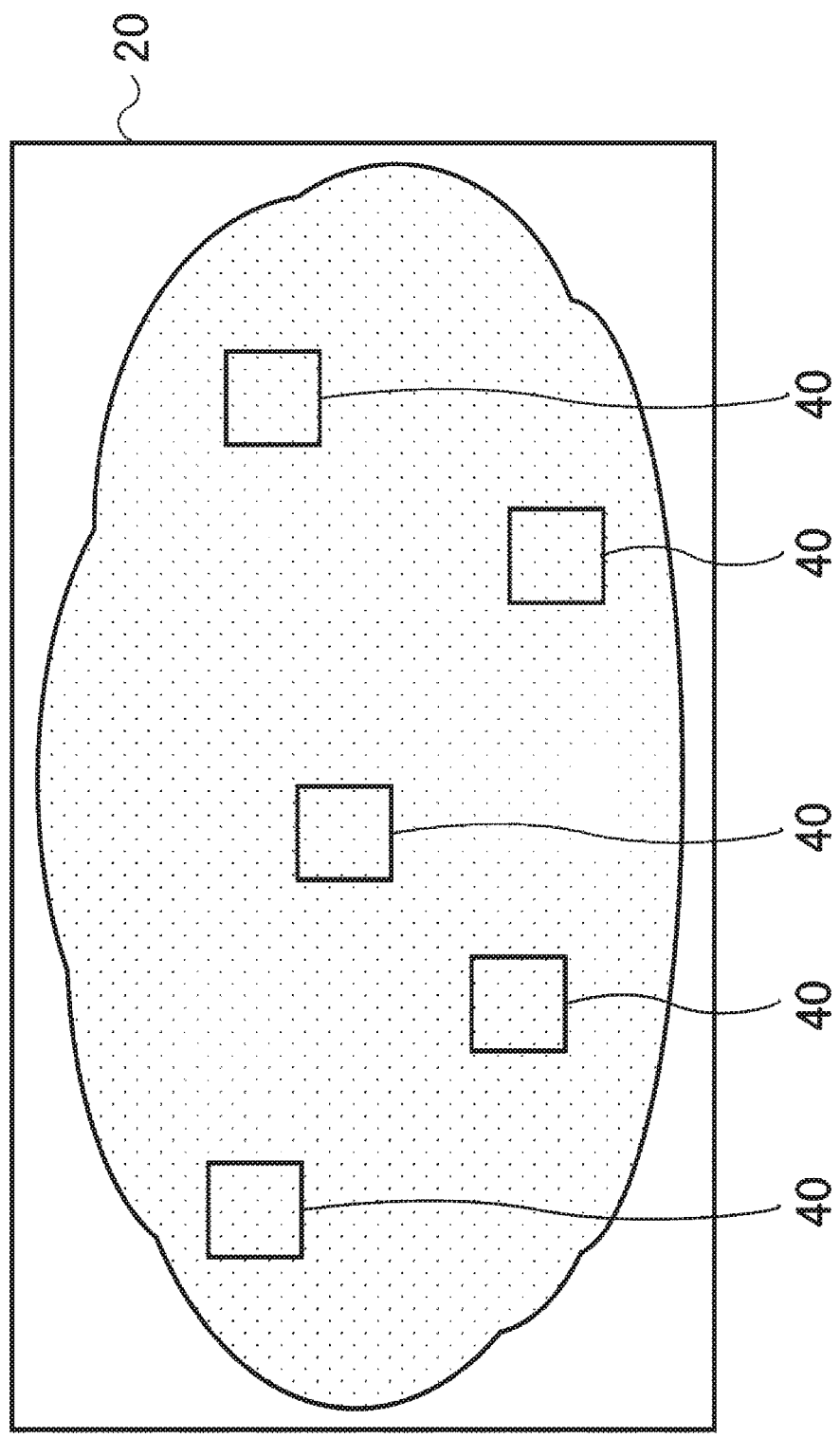
FIG. 7 is a view illustrating a target region included in an analysis image.

FIG. 7 is a view illustrating a target region included in an analysis image. In FIG. 7, five target regions 40 are included in an analysis image 20.

Hereinafter, the function included in the disease analysis apparatus 2000 of this exemplary embodiment will be described.

<Feature-Value Calculation Unit 2040>

The feature-value calculation unit 2040 of Exemplary embodiment 2 calculates the feature-value of cell nuclei included in a target regions included in an analysis image for each of the plurality of target regions. The feature-value calculation unit 2040 calculates the feature-value relating to the shape of some or all cell nuclei included in the target regions. For example, the feature-value calculation unit 2040 calculates, for example, one statistical value by performing statistical processing on the feature-values calculated with respect to the plurality of cell nuclei included in the target regions, and this statistical value is handled as a feature-value relating to the cell nuclei included in the analysis image.

<Prediction Information Generation Unit 2080>

The prediction information generation unit 2080 of Exemplary embodiment 2 generates prediction information for each plurality of target regions. The prediction information generation unit 2080 generates prediction information relating to a target person regarding one target region, based on an evaluation function and a feature-value calculated with respect to the target region.

<Statistical Prediction Information Generation Unit 2100>

The disease analysis apparatus 2000 of Exemplary embodiment 2 has a statistical prediction information generation unit 2100. The statistical prediction information generation unit 2100 performs statistical processing on prediction information generated for each plurality of regions, and generates statistical prediction information.

The statistical prediction information generation unit 2100 determines the presence or absence of a disease indicated by the statistical prediction information, based on the presence or absence of recurrence of the disease indicated by prediction information relating to each plurality of target regions. For example, the statistical prediction information generation unit 2100 generates statistical prediction information indicating that a disease would recur in a case where the prediction information relating to a predetermined number or more target regions indicates that the disease would recur.

The statistical prediction information generation unit 2100 determines a recurrence time of a disease indicated by statistical prediction information based on the recurrence time of the disease indicated by prediction information relating to each plurality of target regions. For example, the statistical prediction information generation unit 2100 handles the recurrence time of a disease indicated by statistical prediction information as a statistical value of the recurrence time of the disease indicated by each of the target regions. This statistical value is an average value, a weighted average value, a central value, the maximum value, the minimum value, the most frequent value, an X percentile value, or the like with respect to the recurrence time of the disease indicated by each piece of prediction information.

The statistical prediction information generation unit 2100 determines malignancy of a disease indicated by the statistical prediction information based on malignancy of the disease indicated by prediction information relating to each plurality of target regions. For example, the statistical prediction information generation unit 2100 handles the malignancy of a disease indicated by statistical prediction information as a statistical value of the malignancy of the disease indicated by each of the target regions. This statistical value is an average value, a weighted average value, a central value, the maximum value, the minimum value, the most frequent value, an X percentile value, or the like with respect to the malignancy of the disease indicated by each piece of prediction information.

<Flow of Processing>

Figure 8:
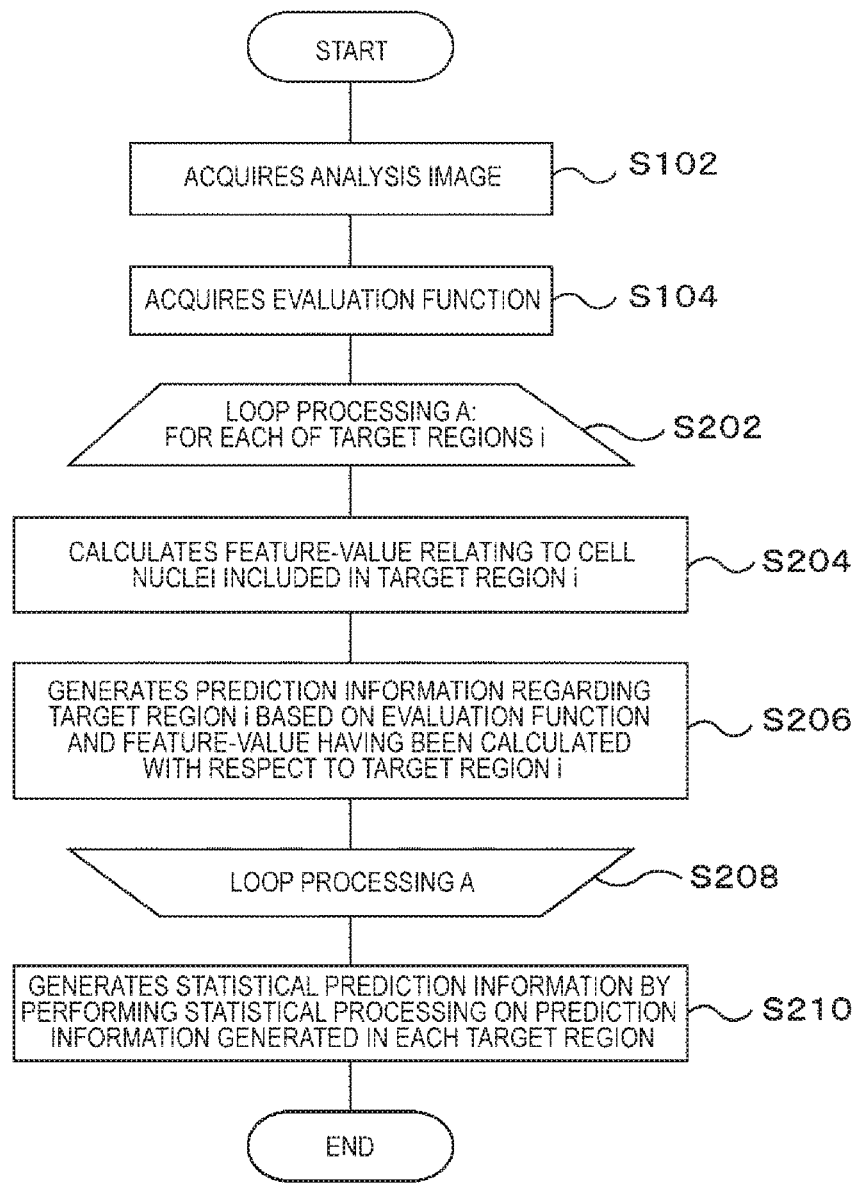
FIG. 8 is a flowchart illustrating the flow of processing executed by the disease analysis apparatus according to Exemplary embodiment 2.

FIG. 8 is a flowchart illustrating the flow of processing executed by the disease analysis apparatus 2000 according to Exemplary embodiment 2. The processing performed in steps S102 and S104 is the same as the processing performed in steps S102 and S104 in FIG. 3 described in Exemplary embodiment 1. Thus, the description of these steps will not be repeated.

Steps S202 to S208 are loop processing A performed in each of the target regions. In Step S202, the disease analysis apparatus 2000 determines whether or not all of the target regions have been handled as a target of the loop processing A. In a case where all of the target regions have been already handled as a target of the loop processing A, the processing in FIG. 8 proceeds to Step S210.

In contrast, in a case where there are target regions that have not been targeted for the loop processing A yet, the disease analysis apparatus 2000 selects one target region among the target regions that have not been targeted for the loop processing A yet. The target region selected in Step S202 is denoted as a target region i. The processing in FIG. 8 proceeds to Step S204.

In Step S204, the feature-value calculation unit 2040 calculates the feature-value relating to cell nuclei included in the target region i. In Step S206, the prediction information generation unit 2080 generates prediction information relating to the target region i based on an evaluation function and a feature-value having been calculated with respect to the target region i.

Step S208 is at the end of the loop processing A. In Step S208, the processing in FIG. 8 proceeds to Step S202.

In Step S210, the statistical prediction information generation unit 2100 generates statistical prediction information by performing statistical processing on the prediction information generated for each of the target regions.

Hereinafter, this exemplary embodiment will be described in more detail.

<Method for Specifying Target Region>

There are various methods with which the disease analysis apparatus 2000 specifies a plurality of the above-described target regions. Examples thereof include a specific method 1 or a specific method 2 shown below.

<<Specific Method 1>>

Figure 9:
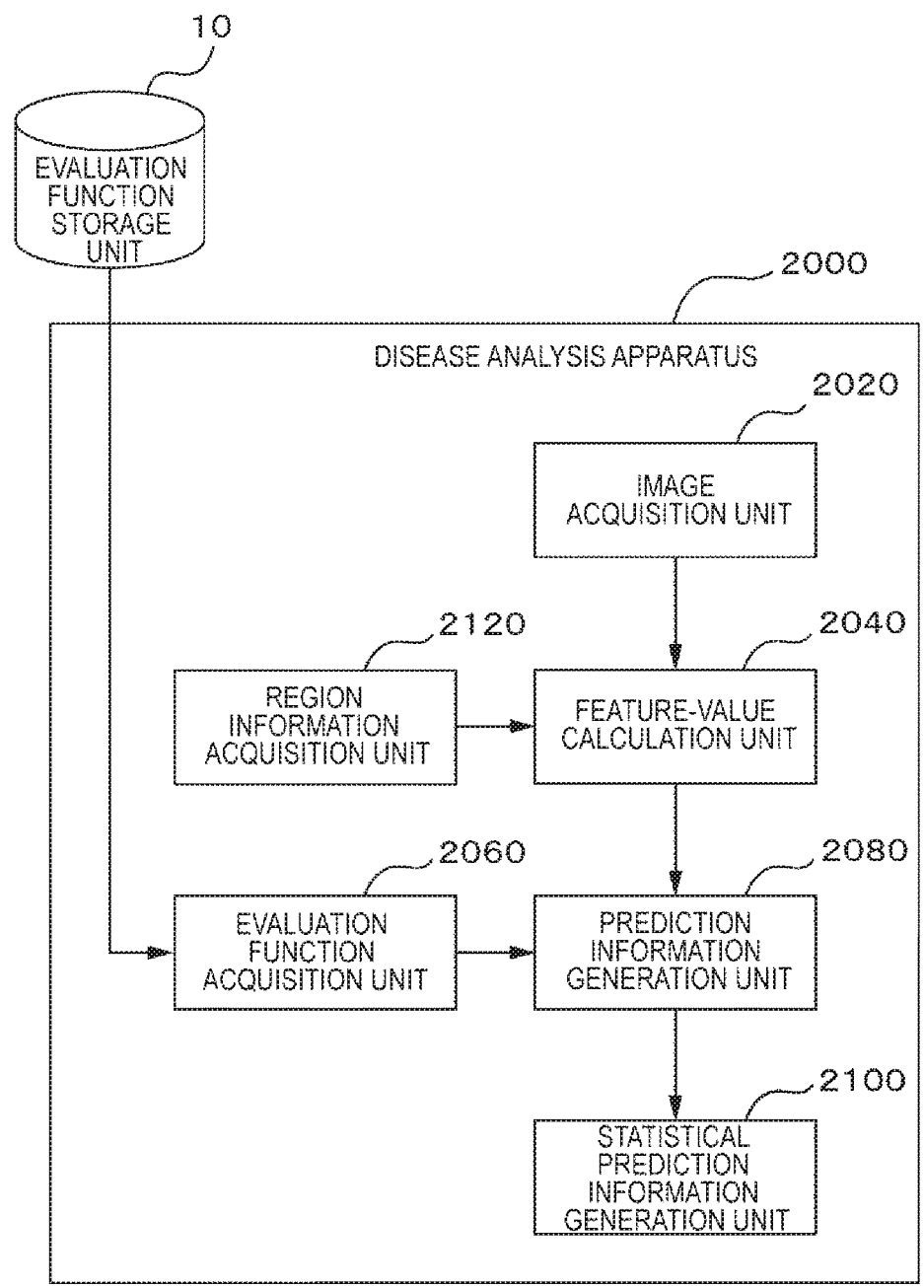
FIG. 9 is a block diagram showing the disease analysis apparatus according to Exemplary embodiment 2 in a case of using a specific method 1.

The disease analysis apparatus 2000 acquires information specifying each plurality of target regions. This information is denoted as region information. FIG. 9 is a block diagram showing the disease analysis apparatus 2000 according to Exemplary embodiment 2 in a case of using a specific method 1. The disease analysis apparatus 2000 has a region information acquisition unit 2120. The region information acquisition unit 2120 acquires region information. In FIG. 9, the arrow represents the flow of information. Furthermore, in FIG. 9, each block does not show a configuration of a hardware unit, but shows a configuration of a functional unit.

The feature-value calculation unit 2040 calculates the feature-value of cell nuclei regarding each plurality of the target regions specified by generation unit 2080 generates prediction information for each of the target regions based on an evaluation function and a feature-value having been calculated with respect to each plurality of target regions specified by region information.

There are various methods with which the region information acquisition unit 2120 acquires region information. For example, the region information acquisition unit 2120 acquires region information input from an external device. In addition, the region information acquisition unit 2120 acquires, for example, region information that is manually input. Furthermore, the region information acquisition unit 2120 may acquire region information by accessing the external device.

<<Specific Method 2>>

Figure 10:
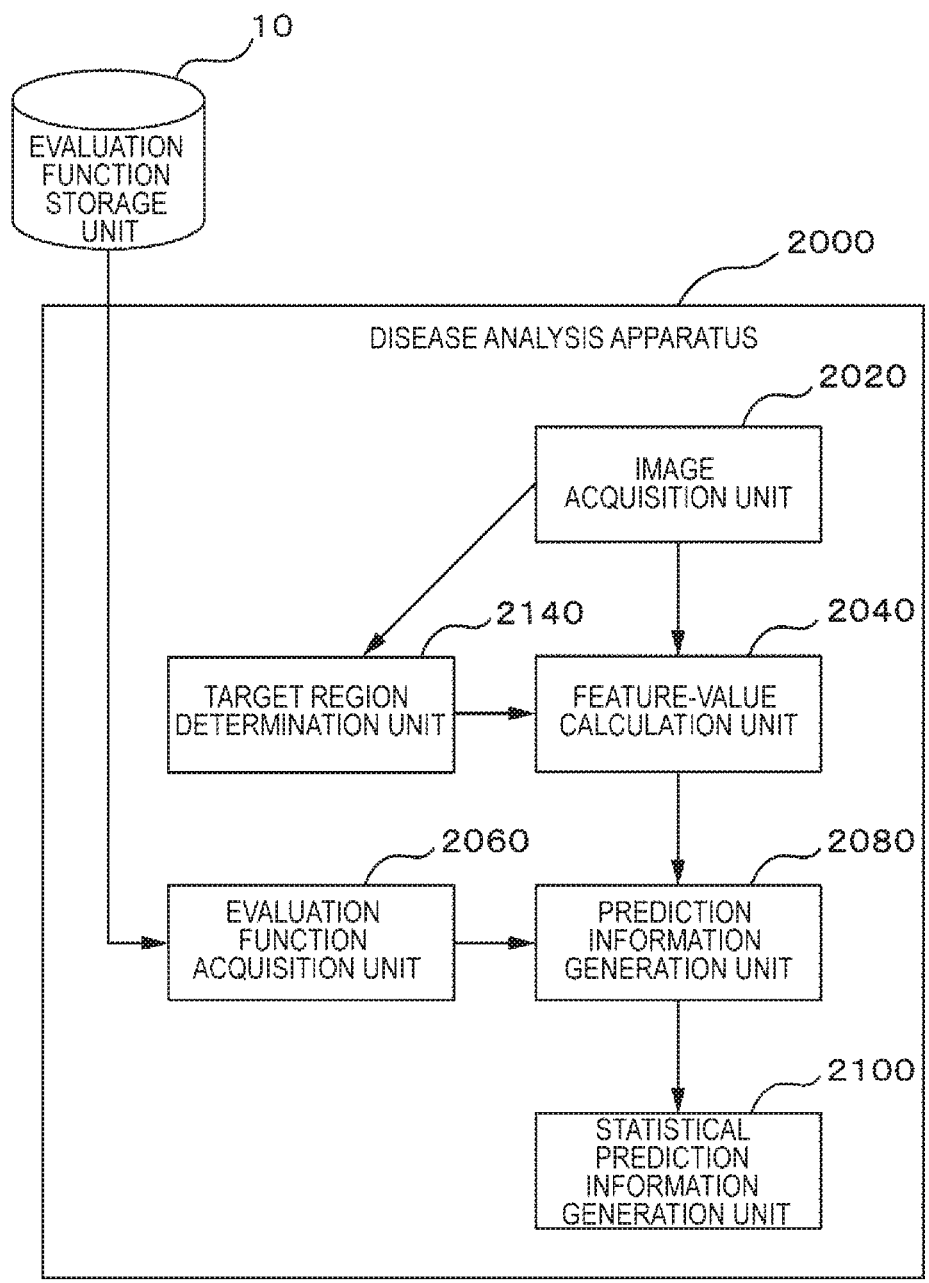
FIG. 10 is a block diagram showing the disease analysis apparatus according to Exemplary embodiment 2 in a case of using a specific method 2.

The disease analysis apparatus 2000 determines a plurality of target regions within the disease analysis apparatus 2000. To do so, the disease analysis apparatus 2000 has a target region determination unit 2140. The target region determination unit 2140 determines a plurality of target regions from an analysis image. FIG. 10 is a block diagram showing the disease analysis apparatus 2000 according to Exemplary embodiment 2 in a case of using a specific method 2. In FIG. 10, the disease analysis apparatus 2000 has the target region determination unit 2140. In FIG. 10, the arrow represents the flow of information. Furthermore, in FIG. 10, each block does not show a configuration of a hardware unit, but shows a configuration of a functional unit.

The feature-value calculation unit 2040 calculates the feature-value relating to cell nuclei with respect to each plurality of target regions determined by the target region determination unit 2140. The prediction information generation unit 2080 generates prediction information for each target region based on an evaluation function and a feature-value having been calculated with respect to each plurality of target regions determined by the target region determination unit 2140.

For example, the target region determination unit 2140 determines target regions as the flow below. First, the feature-value calculation unit 2040 randomly extracts cell nuclei from cell nuclei included in an analysis image. The target region determination unit 2140 causes the feature-value calculation unit 2040 to calculate the feature-value of each of the extracted cell nuclei. The target region determination unit 2140 determines target regions based on the calculated feature-value.

For example, the target region determination unit 2140 causes the prediction information generation unit 2080 to generate prediction information using the feature-value of the randomly extracted cell nuclei. Then, the target region determination unit 2140 specifies cell nuclei the generated prediction information of which shows bad results that "there would be recurrence of a disease" or "malignancy of a disease would be high". Then, the target region determination unit 2140 handles a region including the cell nuclei as a target region. For example, in a case where the shape of the target region is determined, the target region determination unit 2140 handles, as a target region, a determined shape having a specified cell nucleus as one apex or the center. For example, in a case where the shape of the target region is determined as a square shape at 1 mm×1 mm, the target region determination unit 2140 handles, as a target region, the square-shaped region at 1 mm×1 mm having the specified cell nucleus as the apex or the center.

In addition, it is possible that only in a case where the region represented by the determined shape includes a predetermined number or more cell nuclei having a feature-value with which prediction information indicating bad results is generated, the target region determination unit 2140 may handles the region as the target region. By doing this, it is possible to reduce the number of target regions.

<Advantageous Effect>

According to the disease analysis apparatus 2000 of this exemplary embodiment, with the above-described configuration, prediction information is generated based on the feature-value relating to cell nuclei included in each plurality of target regions in an analysis image. Here, in many cases, the analysis image is generally an image having a high resolution. Therefore, the processing time could be long when calculating the feature-value of all cell nuclei included in the analysis image. According to this exemplary embodiment, the number of cell nuclei to be calculated is small compared to the case of calculating the feature-value of all cell nuclei included in the analysis image, and therefore, the processing time required for generating prediction information is shortened.

In addition, according to this exemplary embodiment, statistical prediction information is generated by performing statistical processing on prediction information that is calculated for each of the target regions. It is considered that the accuracy of a prediction of a prognosis of a disease or a prediction of malignancy of a disease is improved in a case where a comprehensive determination is made by performing analysis of a plurality of regions, compared to a case where one region included in an analysis image is analyzed. According to this exemplary embodiment, statistical prediction information is generated, and therefore, a prognosis of a disease or malignancy of a disease is more highly accurately predicted.

In addition, in some cases, the importance of cell nuclei included in an analysis image is not the same as each other.

For example, in some cases, an abnormal shape is shown only in cell nuclei included in a partial region among cell nuclei included in an analysis image. In such a case, it is preferable to intensively perform analysis on the region that includes cell nuclei showing an abnormal shape. According to the disease analysis apparatus 2000 of this exemplary embodiment, it is possible to generate prediction information focusing on such a region by acquiring region information showing such a region as a target region using the above-described specific method 1. As a result, the accuracy of a prediction using the disease analysis apparatus 2000 is improved.

In some cases, it is difficult with human eyes to determine which region should be intensively examined. According to the disease analysis apparatus 2000 of this exemplary embodiment, a target region is determined using the above-described specific method 2. Thus, even in a case where it is difficult with human eyes to determine the range that should be intensively examined, it is possible to determine the range that should be intensively examined. As a result, the accuracy of a prediction using the disease analysis apparatus 2000 is improved.

[Exemplary Embodiment 3]

A disease analysis apparatus 2000 of Exemplary embodiment 3 has the same configuration as that of Exemplary embodiment 1 or 2. For this reason, the drawing of the disease analysis apparatus 2000 of Exemplary embodiment 3 will not be shown.

In Exemplary embodiment 3, the evaluation function storage unit 10 stores a plurality of evaluation functions. The evaluation function acquisition unit 2060 of Exemplary embodiment 3 acquires a plurality of evaluation functions from the evaluation function storage unit 10. Then, the prediction information generation unit 2080 of Exemplary embodiment 3 generates prediction information based on the feature-value and the plurality of evaluation functions.

Each of the plurality of evaluation functions generates prediction information through different methods from each other. For example, each of the evaluation functions uses a different feature-value to generate prediction information. In addition, in a case where each of the evaluation functions performs, for example, weighting on the feature-value, each of evaluation functions apportions a different weight to the feature-value.

The prediction information generation unit 2080 of Exemplary embodiment 3 performs statistical processing on prediction information generated by each of the evaluation functions, and the results of the statistical processing are handled as final prediction information. The method for performing statistical processing on a plurality of pieces of prediction information is the same as the method for generating statistical prediction information described in Exemplary embodiment 2, and therefore, the description thereof will not be repeated.

<Advantageous Effect>

According to this exemplary embodiment, with the above-described configuration, prediction information is generated using a plurality of evaluation functions. Accordingly, it is possible to more accurately predict a prognosis of a disease or malignancy of a disease.

[Exemplary Embodiment 4]

Figure 11:
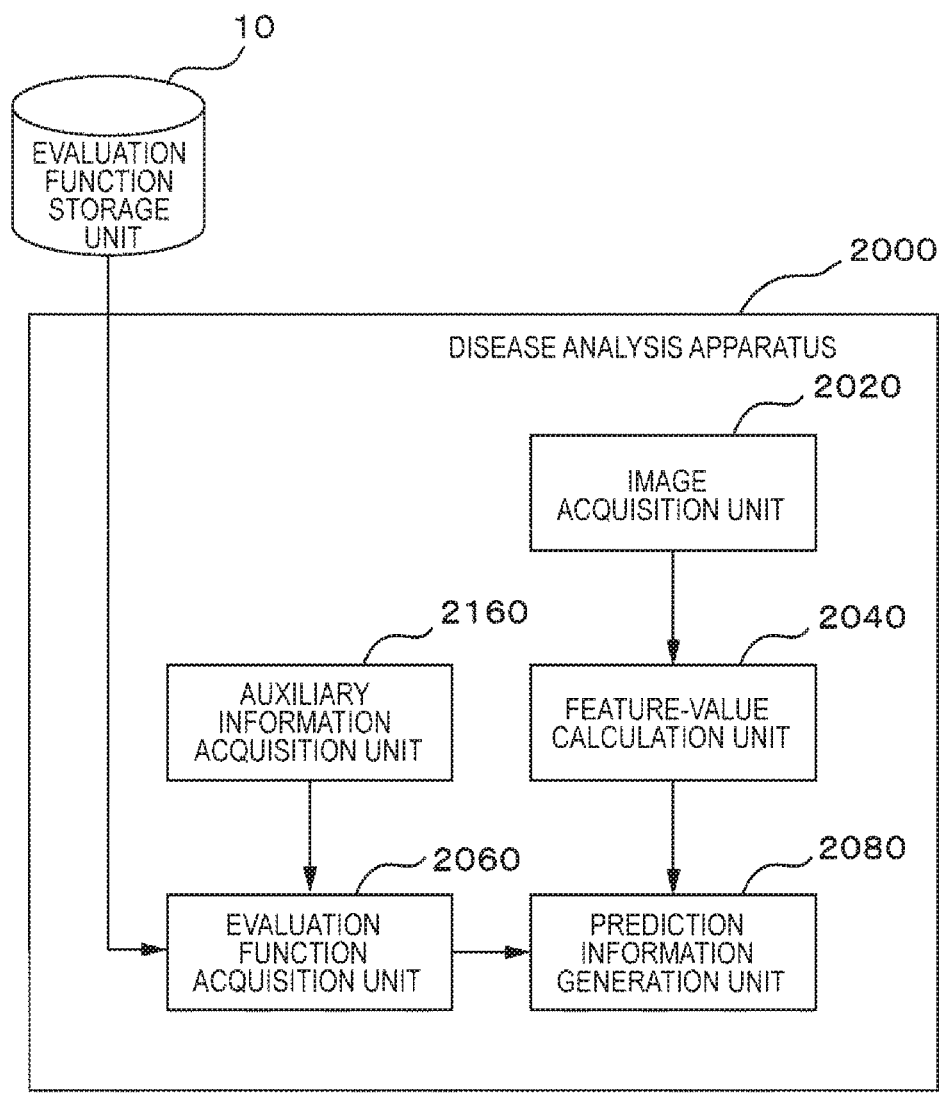
FIG. 11 is a block diagram illustrating a disease analysis apparatus according to Exemplary embodiment 3.

FIG. 11 is a block diagram illustrating a disease analysis apparatus 2000 according to Exemplary embodiment 4. In FIG. 11, the arrow represents the flow of information. Furthermore, in FIG. 11, each block does not show a configuration of a hardware unit, but shows a configuration of a functional unit.

The disease analysis apparatus 2000 of Exemplary embodiment 4 selects an evaluation function to be used in generating prediction information, from a plurality of evaluation functions, based on auxiliary information. The auxiliary information is information indicating elapsed time from imaging an analysis image, or indicating the kind of disease.

<Auxiliary Information Acquisition Unit 2160>

The disease analysis apparatus 2000 of Exemplary embodiment 4 has an auxiliary information acquisition unit 2160. The auxiliary information acquisition unit 2160 acquires auxiliary information. There are various methods with which the auxiliary information acquisition unit 2160 acquires auxiliary information. For example, the auxiliary information acquisition unit 2160 acquires auxiliary information input from an external device. In addition, the auxiliary information acquisition unit 2160 acquires, for example, auxiliary information that is manually input. Furthermore, the auxiliary information acquisition unit 2160 may acquire auxiliary information by accessing the external device.

In Exemplary embodiment 4, the evaluation function storage unit 10 stores a plurality of evaluation functions. The prediction information generation unit 2080 of Exemplary embodiment 4 selects an evaluation function to be used in generating prediction information from a plurality of evaluation functions, which are stored in the evaluation function storage unit, based on auxiliary information. Then, the prediction information generation unit 2080 generates prediction information based on the selected evaluation function and the feature-value having been calculated by the feature-value calculation unit 2040.

For example, the evaluation function storage unit of Exemplary embodiment 4 stores an evaluation function in association with the kind of disease or the elapsed time from imaging an analysis image. The prediction information generation unit 2080 acquires an evaluation function to be used, by retrieving evaluation functions stored in the evaluation function storage unit 10 using the kind of disease or the elapsed period from imaging an analysis image that are indicated by the auxiliary information acquired from the auxiliary information acquisition unit 2160.

<Advantageous Effect>

According to this exemplary embodiment, an evaluation function to be used is selected based on information indicating elapsed time from imaging an analysis image or indicating the kind of disease. Accordingly, it is possible to perform a prediction of a prognosis of a disease or a prediction of malignancy of a disease using an appropriate evaluation function in accordance with the elapsed time from imaging an analysis image or the kind of disease.

In the above, exemplary embodiments of the present invention have been described with respect to the drawings, but are merely examples of the present invention. Moreover, it is also possible to combine the above-described exemplary embodiments and to employ various configurations other than the above-described exemplary embodiments.

The present invention does not deny use of information of a tissue structure or information of cytoplasm in predicting a prognosis or malignancy of a disease. A prediction using features of a cell nucleus that the present invention performs can be combined with or used together with the prediction using the information of a tissue structure or the information of cytoplasm. By doing so, the prediction of a prognosis or malignancy of a disease can be more highly accurately performed. In addition, the present invention can improve the accuracy of the prediction by being combined with gene diagnosis.

Priority is claimed on Japanese Patent Application No. 2013-193859, filed Sep. 19, 2013, the whole disclosure of which is incorporated herein by reference.

The invention claimed is:

1. A disease analysis apparatus comprising a memory storing instructions and a processor configured to execute the instructions to:
   acquire an analysis image that is an image in which a plurality of cell nuclei in a lesion of a target person are captured;
   calculate a feature-value relating to the cell nuclei using the analysis image;
   acquire an evaluation function from the memory;
   generate prediction information relating to the target person, based on the feature-value calculated from the analysis image, and based on the evaluation function, the prediction information indicating a prediction relating to a prognosis of a disease or a prediction relating to malignancy of a disease;
   determine a plurality of target regions from the analysis image by:
      generating the prediction information for each of the plurality of cell nuclei based on the feature-value calculated for each of the plurality of cell nuclei and the acquired evaluation function,
      determining the prediction information indicating a possibility of recurrence of a disease or high malignancy of a disease, among the generated prediction information, and
      determining a region in the analysis image as one of the plurality of target regions, the determined region including the cell nuclei for which the determined prediction information is generated;
   calculate the feature-value relating to each target region;
   generate the prediction information for each target region based on the feature-value relating the target region and the acquired evaluation function; and
   perform a statistical process on the prediction information generated for each target region, thereby generating statistical prediction information relating to the target person.

2. The disease analysis apparatus according to claim 1, the processor is configured to execute the instructions to determine the plurality of target regions by acquiring region information that specifies the plurality of target regions.

3. The disease analysis apparatus according to claim 1, wherein the processor is configured to execute the instructions to:
   acquire a plurality of the evaluation functions from the memory, and
   generate the prediction information based on the feature-value and the plurality of evaluation functions.

4. The disease analysis apparatus according to claim 1, wherein the memory stores the plurality of evaluation functions,
   wherein the processor configured to execute the instructions to:
      acquire auxiliary information that is information indicating elapsed time from imaging the analysis image, or indicate the kind of the disease, and
      select, based on the auxiliary information, the evaluation function from the plurality of evaluation functions, and generate the prediction information using the selected evaluation function.

5. The disease analysis apparatus according to claim 1, wherein the feature-value relating to the cell nuclei is any one or more factors of a perimeter of a cell nucleus, a major diameter of the cell nucleus, a minor diameter of the cell nucleus, a degree of circularity of the cell nucleus, an area of the cell nucleus, a ratio of an area of a rectangle composed of the major diameter and the minor diameter of the cell nucleus to an area of the cell nucleus, a complexity of a contour line of the cell nucleus, a density of the cell nucleus, or a dyeing state within the cell nucleus.

6. A control method executed by a computer, the method comprising:
   acquiring an analysis image that is an image in which a plurality of cell nuclei in a lesion of a target person are captured;
   calculating a feature-value relating to the cell nuclei using the analysis image;
   acquiring an evaluation function from a memory;
   generating prediction information relating to the target person, based on the feature-value calculated from the analysis image, and based on the evaluation function, the prediction information indicating a prediction relating to a prognosis of a disease or a prediction relating to malignancy of a disease;
   determining a plurality of target regions from the analysis image by:
      generating the prediction information for each of the plurality of cell nuclei based on the feature-value calculated for each of the plurality of cell nuclei and the acquired evaluation function,
      determining the prediction information indicating a possibility of recurrence of a disease or high malignancy of a disease, among the generated prediction information, and
      determining a region in the analysis image as one of the plurality of target regions, the determined region including the cell nuclei for which the determined prediction information is generated;
   calculating the feature-value relating to each target region;
   generating the prediction information for each target region based on the feature-value relating the target region and the acquired evaluation function; and
   performing a statistical process on the prediction information generated for each target region, thereby generating statistical prediction information relating to the target person.

7. The control method according to claim 6, further comprising acquiring region information that specifies the plurality of target regions.

8. The control method according to claim 6,
   wherein in the step of acquiring an evaluation function, a plurality of the evaluation functions are acquired from the memory, and
   wherein in the step of generating the prediction information, the prediction information is generated based on the feature-value and the plurality of evaluation functions.

9. The control method according to claim 6,
   wherein the memory stores the plurality of evaluation functions,
   wherein the control method further comprises acquiring auxiliary information that is information indicating elapsed time from imaging the analysis image, or indicating the kind of the disease, and
   wherein in the step of generating the prediction information, the evaluation function is selected, based on the auxiliary information, from the plurality of evaluation functions, and the prediction information is generated using the selected evaluation function.

10. The control method according to claim 6, wherein the feature-value relating to cell nuclei has any one or more factors of a perimeter of a cell nucleus, a major diameter of the cell nucleus, a minor diameter of the cell nucleus, a degree of circularity of the cell nucleus, an area of the cell nucleus, a ratio of an area of a rectangle composed of the major diameter and the minor diameter of the cell nucleus to an area of the cell nucleus, a complexity of a contour line of the cell nucleus, a density of the cell nucleus, or a dyeing state within the cell nucleus.

11. A non-transitory computer-readable storage medium storing a program causing a computer to have functions to be operated as a disease analysis apparatus, the program causes the computer to execute:
   acquiring an analysis image that is an image in which a plurality of cell nuclei in a lesion of a target person are captured;
   calculating a feature-value relating to the cell nuclei from the analysis image;
   acquiring an evaluation function from the storage medium;
   generating prediction information relating to the target person, based on the feature-value calculated from the analysis image, and based on the evaluation function, the prediction information indicating a prediction relating to a prognosis of a disease or a prediction relating to malignancy of a disease;
   determining a plurality of target regions from the analysis image by:
      generating the prediction information for each of the plurality of cell nuclei based on the feature-value calculated for each of the plurality of cell nuclei and the acquired evaluation function,
      determining the prediction information indicating a possibility of recurrence of a disease or high malignancy of a disease, among the generated prediction information, and
      determining a region in the analysis image as one of the plurality of target regions, the determined region including the cell nuclei for which the determined prediction information is generated;
   calculating the feature-value relating to each target region;
   generating the prediction information for each target region based on the feature-value relating the target region and the acquired evaluation function; and
   performing a statistical process on the prediction information generated for each target region, thereby generating statistical prediction information relating to the target person.

12. The non-transitory computer-readable storage medium according to claim 11, wherein the program causes the computer to further execute acquiring region information that specifies the plurality of target regions.

13. The non-transitory computer-readable storage medium according to claim 11,
   wherein in the step of acquiring an evaluation function, a plurality of the evaluation functions are acquired from the storage medium, and
   wherein in the step of generating the prediction information, the prediction information is generated based on the feature-value and the plurality of evaluation functions.

14. The non-transitory computer-readable storage medium according to claim 11,
   wherein the storage medium stores the plurality of evaluation functions, wherein the program causes the computer to further execute acquiring auxiliary information that is information indicating elapsed time from imaging the analysis image, or indicating the kind of the disease, and wherein in the step of generating the prediction information, the evaluation function is selected, based on the auxiliary information, from the plurality of evaluation functions, and the prediction information is generated using the selected evaluation function.

15. The non-transitory computer-readable storage medium according to claim 11, wherein the feature-value relating to cell nuclei has any one or more factors of a perimeter of a cell nucleus, a major diameter of the cell nucleus, a minor diameter of the cell nucleus, a degree of circularity of the cell nucleus, an area of the cell nucleus, a ratio of an area of a rectangle composed of the major diameter and the minor diameter of the cell nucleus to an area of the cell nucleus, a complexity of a contour line of the cell nucleus, a density of the cell nucleus, or a dyeing state within the cell nucleus.

* * * * *